UNITED STATES PATENT OFFICE.

HARRY CROSWELL MORRIS, OF RICHMOND, VIRGINIA, ASSIGNOR TO THOMAS H. HAZARD, OF SAME PLACE.

IMPROVEMENT IN ARTIFICIAL FOOD.

Specification forming part of Letters Patent No. 136,447, dated March 4, 1873.

*To all whom it may concern:*

Be it known that I, HARRY CROSWELL MORRIS, of Richmond, in the State of Virginia, assignor to THOMAS HULL HAZARD, have invented certain new and useful Improvements in Artificial Food, of which the following is a description:

Nature and Objects of the Invention.

The invention relates to an artificial food, being a compound of all substances in animal matter which are soluble in gastric juice or pepsin.

General Description.

The flesh of the animal or any other part which contains matter soluble in gastric juice or pepsin is first divested of all adipose or fatty matter, and then macerated or otherwise reduced to a pulpy condition, after which it is mixed with the whole or a portion of the fresh digestive organs of any animal, which organs are likewise macerated or otherwise reduced to a pulp; muriatic or lactic acid is next added to facilitate the artificial digestion of the mass; glycerine or its equivalent is next mixed with the above to produce thereon an antiseptic effect, and a proper quantity of water is then added. This mixture is now subjected for a proper period, from four (4) to eight (8) hours, to the requisite degree of heat, not exceeding one hundred and twenty degrees (120°) Fahrenheit, after which all liquid is extracted, the free acid in which is neutralized by the use of a carbonate of soda or other agent effective for that purpose. The liquid is now allowed to cool, and all remaining adipose matter as it rises to the top is removed. The liquid is then strained or filtered, after which it is evaporated to any proper consistency under a degree of heat not exceeding one hundred and twenty (120°) degrees Fahrenheit, and is then ready for use.

The denser the consistency of the mass the greater will be its capacity for preservation.

The object sought by the above process is to extract from animal matter all material which is soluble in gastric juice or pepsin, amalgamate or combine the same into a mass of such character that it is capable of preservation, thus producing an article of food which has undergone the process of digestion.

Claims.

What I claim as my invention, and desire to secure by Letters Patent, is—

1. The article of artificial food, substantially as herein described.

2. The application of the digestive organs of an animal in the production of artificial food, substantially as described.

3. The process for the production of artificial food, substantially as described.

In testimony that I claim the foregoing improvement in artificial food, as above described, I have hereunto set my hand and seal this 17th day of January, 1873.

H. C. MORRIS. [L. S.]

Witnesses:
THOMAS A. BRENDER,
W. H. TYNE.